(12) United States Patent
Sobagaki et al.

(10) Patent No.: US 8,172,423 B2
(45) Date of Patent: May 8, 2012

(54) ILLUMINATION APPARATUS

(75) Inventors: Tamami Sobagaki, Nagaokakyou (JP); Shigeo Gotou, Yao (JP); Tadashi Murakami, Hirakata (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 275 days.

(21) Appl. No.: 12/588,746

(22) Filed: Oct. 27, 2009

(65) Prior Publication Data

US 2010/0102758 A1 Apr. 29, 2010

(30) Foreign Application Priority Data

Oct. 27, 2008 (JP) .................... 2008-275908

(51) Int. Cl.
*F21V 1/00* (2006.01)
(52) U.S. Cl. ........ 362/240; 362/276; 362/611; 362/612; 315/149; 315/159; 315/307; 315/312; 250/552; 250/205; 250/338.1
(58) Field of Classification Search .............. 342/82, 342/84, 89, 99, 147, 157, 200, 357.78; 315/291, 315/294, 307, 312, 360, 77, 149, 159; 362/240, 362/252, 276, 249.02, 611, 612, 623; 250/205, 250/552, 338.1, 214 AL, 214 R
See application file for complete search history.

(56) References Cited

U.S. PATENT DOCUMENTS

| | | | |
|---|---|---|---|
| 5,929,644 A * | 7/1999 | Sokolov | 356/237.5 |
| 6,402,338 B1 | 6/2002 | Mitzel et al. | |
| 6,700,529 B2 * | 3/2004 | Matsuura | 342/70 |
| 6,960,759 B2 * | 11/2005 | Konagaya | 250/238 |
| 7,106,421 B2 * | 9/2006 | Matsuura et al. | 356/4.01 |
| 7,138,939 B2 * | 11/2006 | Honda | 342/129 |
| 7,528,553 B2 * | 5/2009 | Ito et al. | 315/291 |

FOREIGN PATENT DOCUMENTS

| | | |
|---|---|---|
| DE | 20 2008 000 804 | 5/2008 |
| EP | 1 408 276 | 4/2004 |
| JP | 2004-281327 | 10/2004 |

OTHER PUBLICATIONS

European Search Report dated Feb. 19, 2010.

* cited by examiner

*Primary Examiner* — Haiss Philogene
(74) *Attorney, Agent, or Firm* — Bacon & Thomas, PLLC

(57) ABSTRACT

An illumination apparatus includes a light source unit having solid light-emitting elements and a sensor unit having a wave transmission portion for transmitting energy waves of specified frequency and a wave reception portion for receiving the energy waves reflected from an object. The sensor unit outputs a detection signal by detecting the object within a detection range based on the difference in frequency between the transmitted and received energy waves. The illumination apparatus further includes a control unit responsive to the detection signal from the sensor unit for performing a control operation to turn on the light source unit, and a power source unit for supplying electric power to the light source unit. The power source unit is arranged outside the detection range of the sensor unit. The sensor unit is provided on the opposite side to the direction of light irradiated from the light source unit.

15 Claims, 7 Drawing Sheets

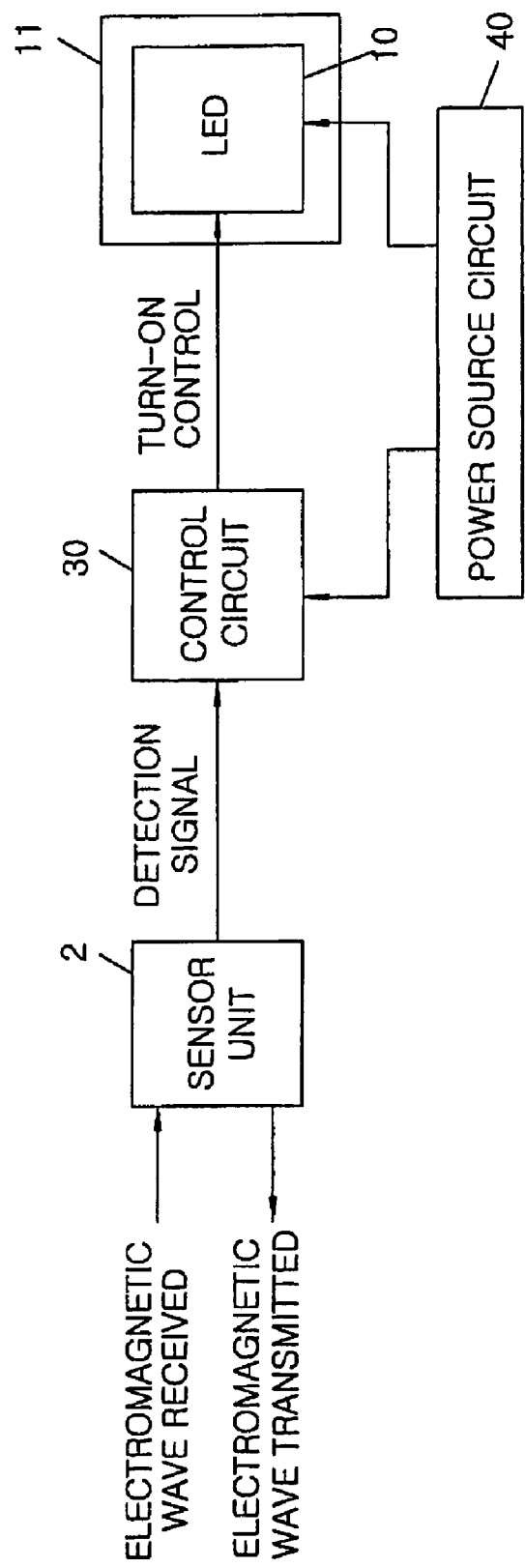

ILLUMINATION APPARATUS

FIELD OF THE INVENTION

The present invention relates to an illumination apparatus provided with a sensor for detecting the presence or absence of a moving object such as a human body or the like.

BACKGROUND OF THE INVENTION

Conventionally, there is known an illumination apparatus provided with a sensor for detecting the presence or absence of a human body and designed to turn on or off a lamp depending on the presence or absence of a human body, one example of which is disclosed in Japanese Patent Laid-open Publication No. 2001-325810. In case where a passive sensor, e.g., a heat ray sensor, for detecting infrared rays emitted from a human body is used as the human sensor, it is necessary to expose the sensor toward a detection direction. This poses a problem in that the sensor imposes a limitation on the structure of the illumination apparatus and adversely affects the outward appearance thereof. In order to enable the sensor to detect a human body even when installed within the illumination apparatus, it may be conceivable to use a so-called active sensor capable of transmitting energy waves such as electromagnetic waves or the like and receiving the energy waves reflected from a target object to detect the presence or absence of the target object depending on the existence and nonexistence of a Doppler frequency, namely the difference between the frequency of the transmitted waves and the frequency of the received waves.

One conventional illumination apparatus provided with the afore-mentioned active sensor will now be described with reference to FIG. 6. As illustrated in FIG. 6, the conventional illumination apparatus includes a housing body 100 of elongated box shape with one side opened, a pair of sockets (not shown) arranged in the longitudinal opposite end portions of the housing body 100, a straight tube type discharge lamp La held by the sockets, a sensor unit 101 installed within the housing body 100 at the opposite side to the open side of the housing body 100 with the discharge lamp La interposed therebetween, a reflection plate 102 of elongated plate shape arranged on the inner surface of the housing body 100 for reflecting the electromagnetic waves transmitted from the sensor unit 101 and irradiating the same toward the outside of the housing body 100 through the open side, and a control unit 103 for performing a control operation to turn on the discharge lamp La in response to the detection signal supplied from the sensor unit 101. In the conventional illumination apparatus, the sensor unit 101 is arranged substantially at the longitudinal center of the discharge lamp La and on the opposite site to the light irradiation direction of the discharge lamp La in order to meet the demand for smaller transverse dimension and improved outward appearance of the housing body 100 and the demand for the sensor unit 101 to have a uniform detection range about the housing body 100.

In the conventional illumination apparatus, however, the waves transmitted from the sensor unit 101 are reflected by the electrons present inside the discharge lamp La because the discharge lamp La exists within the detection range of the sensor unit 101. Since the electrons present inside the discharge lamp La are moving during the turned-on period of the discharge lamp La, a Doppler effect is generated as in the case where electromagnetic waves are reflected from an object to be detected. During the turned-on period of the discharge lamp La, therefore, the sensor unit 101 continues to work as if it has detected a target object. This makes it impossible to accurately detect the presence or absence of a target object.

SUMMARY OF THE INVENTION

In view of the above, the present invention provides an illumination apparatus capable of accurately detecting the presence or absence of an object without imposing a limitation on its structure and adversely affecting its outward appearance.

In accordance with an aspect of the present invention, there is provided an illumination apparatus including: a light source unit including one or more solid light-emitting elements; a sensor unit including a wave transmission portion for transmitting energy waves of specified frequency and a wave reception portion for receiving the energy waves reflected from an object, the sensor unit being configured to output a detection signal by detecting the presence or absence of the object within a detection range based on the difference in frequency between the transmitted and received energy waves; a control unit responsive to the detection signal outputted from the sensor unit for performing a control operation to turn on the light source unit; and a power source unit for supplying electric power to the light source unit, the power source unit being arranged outside the detection range of the sensor unit, wherein the sensor unit is provided on the opposite side to the direction of light irradiated from the light source unit.

The sensor unit is preferably arranged so that the light source unit lies within the detection range.

Preferably, the light source unit further includes a light source substrate made of a material capable of passing the energy waves therethrough, the solid light-emitting elements being arranged on the light source substrate.

The energy waves transmitted and received by the sensor unit may be electromagnetic waves.

With the present invention, the sensor unit is provided on the opposite side to the direction of light irradiated from the light source unit. This makes it possible to prevent the sensor unit from becoming visible from the outside of the housing body. Therefore, the sensor unit does not impose a limitation on the apparatus structure nor adversely affect the outward appearance of the illumination apparatus. In addition, the light source includes the solid light-emitting elements. Thus, no Doppler effect is generated even if the energy waves coming from the sensor unit are reflected by the light source. This prevents the sensor unit from staying in a detected state at all times, making it possible for the sensor unit to accurately detect the presence or absence of an object.

BRIEF DESCRIPTION OF THE DRAWINGS

FIG. 1C is a block diagram of the illumination apparatus.

DETAILED DESCRIPTION OF THE PREFERRED EMBODIMENTS

Hereinafter, an illumination apparatus in accordance with an embodiment of the present invention will be described with reference to the accompanying drawings. In the following description, the up-and-down direction in FIG. 1A will be referred to as a vertical direction.

Figure 1A:
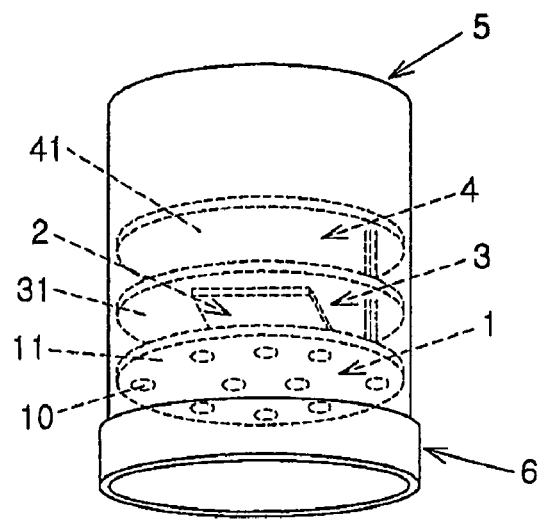
FIG. 1A is a perspective view showing the overall configuration of an illumination apparatus in accordance with an embodiment of the present invention.
Figure 1B:
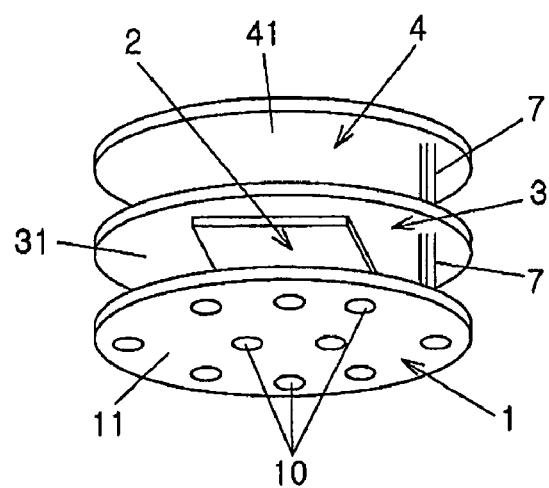
FIG. 1B is a perspective view of the illumination apparatus with a housing body and a shade unit removed for clarity.

As shown in FIGS. 1A through 1C, the illumination apparatus of the present invention includes a light source unit 1, which includes a generally disk-shaped light source substrate 11 and a plurality of light-emitting diodes (hereinafter abbreviated as "LEDs") 10 as a solid light-emitting element arranged on the light source substrate 11; an active sensor unit 2 for transmitting and receiving electromagnetic waves to detect the presence or absence of a moving object by virtue of a Doppler effect; a control unit 3 having a generally disk-shaped control substrate 31 in which the sensor unit 2 is arranged and on which a control circuit 30 for performing a control operation to turn on the LEDs 10 is mounted; a power source unit 4 having a generally disk-shaped power source substrate 41 connected to an external power source (not shown), the power source substrate 41 including a power source circuit 40 for supplying electric power to the LEDs 10 through the control circuit 30; an open-bottom cylindrical housing body 5 for accommodating the light source unit 1, the sensor unit 2, the control unit 3 and the power source unit 4; and a shade unit 6 attached to the lower end portion of the housing body 5 for controlling the light irradiated from the power source unit 1. The circuits of the light source unit 1, the control unit 3 and the power source unit 4 are electrically connected to one another by interconnecting the connectors (not shown) of the circuits with flat cables 7 as shown in FIG. 1B.

Figure 2:
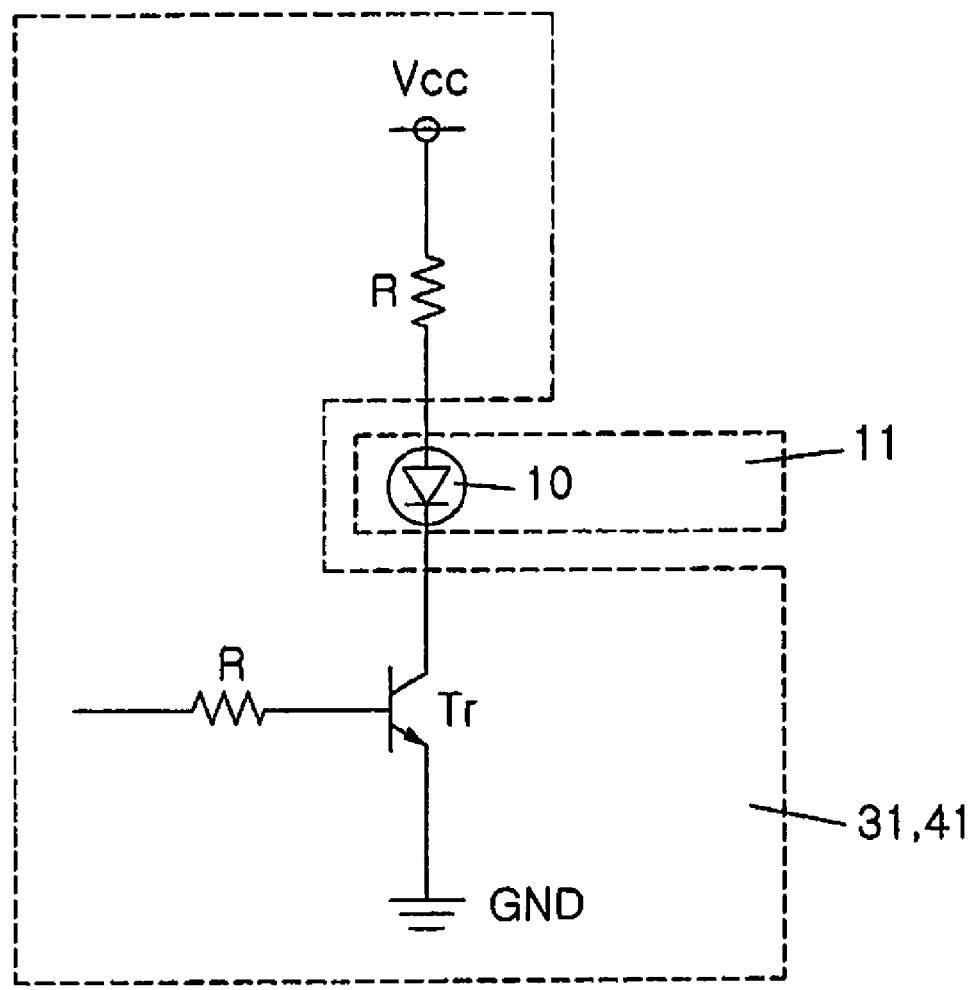
FIG. 2 is a circuit diagram showing a turn-on circuit for a single light-emitting diode employed in the illumination apparatus.

The light source substrate 11 of the light source unit 1 is made of a material such as glass epoxy or paper phenol through which the electromagnetic waves from the sensor unit can pass. On the lower surface of the light source substrate 11, the LEDs 10 are evenly arranged so as to uniformly irradiate light toward the space defined below the housing body 5 as illustrated in FIG. 1B. Besides the LEDs 10, only a conductor pattern 12 for electrically interconnecting the LEDs 10, the control circuit 30 and the power source circuit 40 is formed on the light source substrate 11 (see FIGS. 3A and 3B). Referring to FIG. 2, there is shown a turn-on circuit for one of the LEDs 10. Only the LEDs 10 are mounted to the light source substrate 11, while the remaining components, i.e., resistors R, a transistor Tr, a power supply Vcc and a ground pattern GND, are mounted to the control substrate 31 and the power source substrate 41. That is to say, minimum necessary components are arranged in the light source substrate 11, excluding the circuit elements containing a material that reflects or absorbs the electromagnetic waves from the sensor unit 2. This is to ensure that the electromagnetic waves from the sensor unit 2 can pass through the light source substrate 11 in the greatest possible quantity.

Figure 3A:
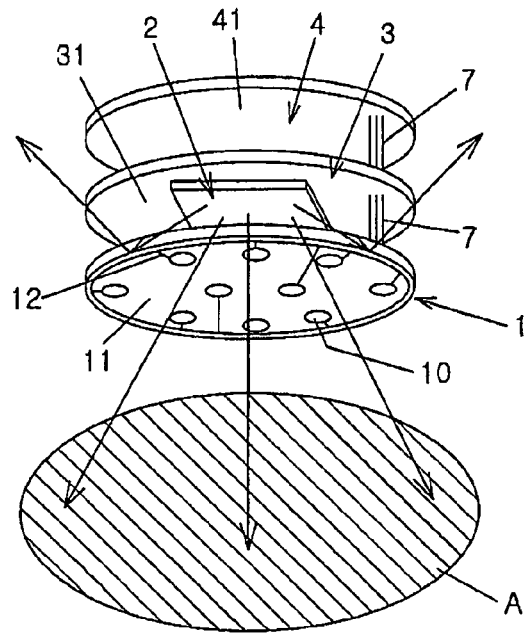
FIGS. 3A and 3B are views illustrating different wiring examples of a conductor wire pattern employed in the illumination apparatus.
Figure 3B:
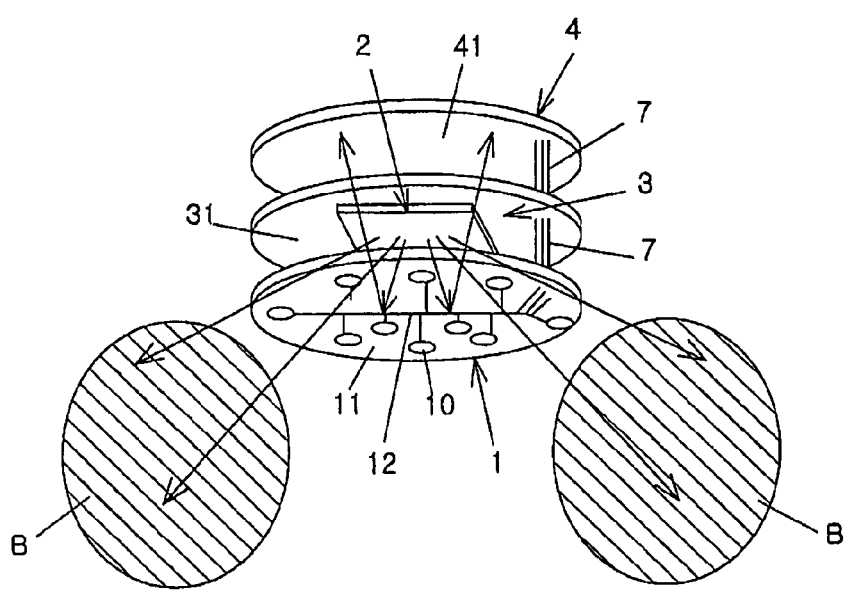

Since the conductor pattern 12 is made of a metallic material, the electromagnetic waves sent from the sensor unit 2 are reflected by the conductor pattern 12. For that reason, it is preferred that the conductor pattern 12 is arranged so as not to lie in the desired detection path when seen from the sensor unit 2. For example, if the space just below the light source unit 1 is to be set as a major detection range, it is desirable to arrange the conductor pattern 12 in the peripheral portion of the light source substrate 11 and not the central portion thereof as illustrated in FIG. 3A (in which view the hatched area A is the detection range). If the spaces existing in the directions inclined outwardly with respect to the light irradiation direction of the light source unit 1 are to be set as major detection ranges, it is desirable to arrange the conductor pattern 12 in the central portion of the light source substrate 11 and not the peripheral portion thereof as illustrated in FIG. 3B (in which view the hatched areas B are the detection ranges).

Figure 4:
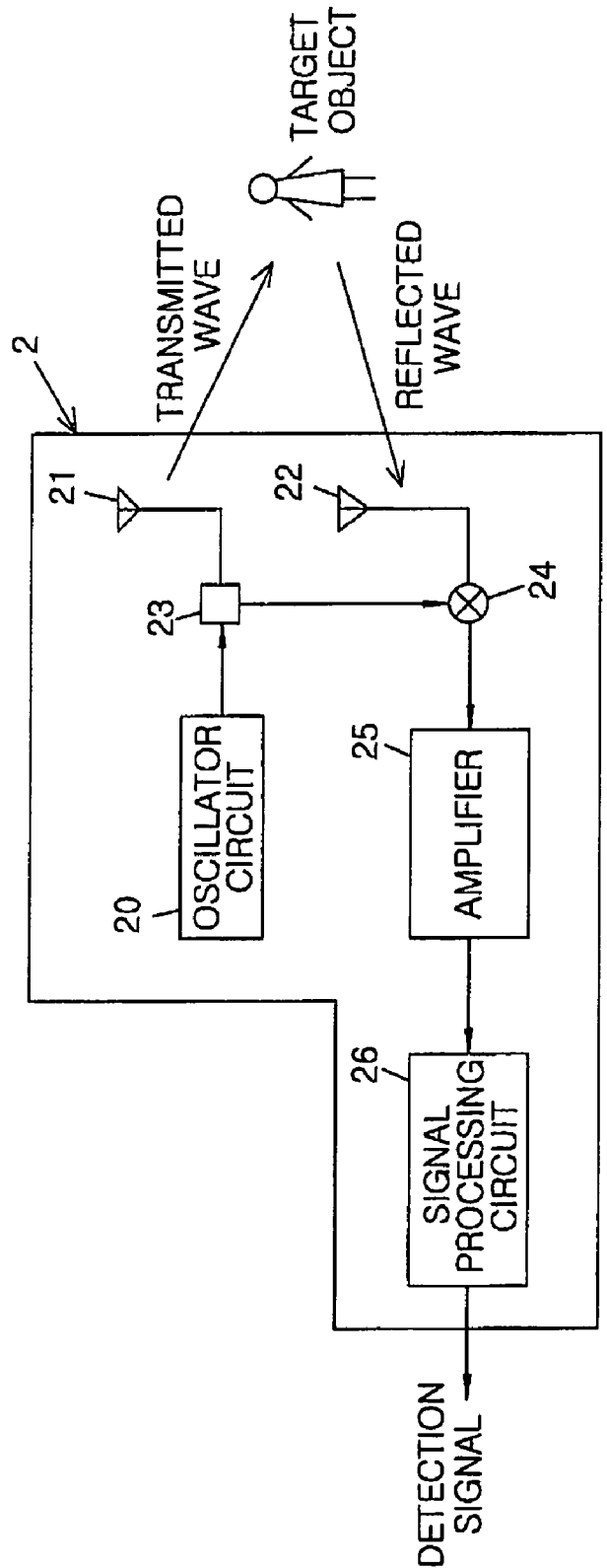
FIG. 4 is a block diagram showing a sensor unit employed in the illumination apparatus.

Referring to FIG. 4, the sensor unit 2 includes an oscillator circuit 20 for generating a wave transmission signal of specified frequency (in the present embodiment, a signal of 24 GHz or so prescribed as a frequency for mobile object sensors of a specified low-power radio station under the Japan Radio Act); a signal transmission antenna 21 as a signal transmission portion responsive to the wave transmission signal supplied from the oscillator circuit 20 for outputting energy waves toward a detection space; a signal reception antenna 22 as a signal reception portion for receiving the waves reflected from an object present in the detection space and outputting a wave reception signal; a distributor 23 for distributing the wave transmission signal to the signal transmission antenna 21 and a mixer 24 to be set forth next; the mixer 24 for mixing the wave reception signal and the wave transmission signal and outputting a signal corresponding to a Doppler frequency which is the difference between the frequencies of the wave reception signal and the wave transmission signal; an amplifier 25 for amplifying the signal supplied from the mixer 24 and outputting an amplified signal; and a signal processing circuit 26 for comparing the waveform of the amplified signal with a pre-stored reference waveform to determine whether an object was detected and outputting a detection signal depending on the results of determination. Since the circuit configuration of the sensor for detecting a moving object by virtue of a Doppler effect is well-known in the art, no detailed description will be made herein in that regard.

As shown in FIG. 1C, the control circuit 30 of the control unit 3 turns on or off the LEDs 10 in response to the detection signal supplied from the signal processing circuit 26 of the sensor unit 2. More specifically, if the detection signal is not inputted, the control circuit 30 turns off the LEDs 10 by interrupting a power supply path through which electric power is supplied from the power source circuit 40 of the power source unit 4 to the LEDs 10. If the detection signal is inputted, the control circuit 30 turns on the LEDs 10 by closing the power supply path. Since the configuration of the control circuit 30 is well-known in the art, no detailed description will be made herein in that regard.

The power source circuit 40 of the power source unit 4 serves to supply electric power to the control circuit 30 of the control unit 3 and the LEDs 10 by, e.g., converting an alternating current of a commercial power source to a direct current. Since the configuration of the power source circuit 40 is well-known in the art, no detailed description will be made herein in that regard. The power source circuit 40 includes a plurality of circuit elements and a large number of conductor patterns. In addition, a ground pattern is widely arranged on one surface of the power source substrate 41 in order to stabilize an electric potential. Therefore, the power source substrate 41 remains in a state as if the entire surface is substantially covered with metal. This makes it impossible for the power source substrate 41 to pass electromagnetic waves therethrough. In the present embodiment, therefore, the power source substrate 41 is arranged on the opposite side to the direction of the electromagnetic waves outputted from the sensor unit 2, meaning that the power source unit 4 lies outside the detection range of the sensor unit 2. This makes it possible to prevent the power source unit 4 from narrowing the detection range of the sensor unit 2.

In the present embodiment, the control substrate 31 is arranged between the light source substrate 11 and the power source substrate 41, namely above the light source substrate 11. This makes it possible to prevent the sensor unit 2 from becoming visible from the outside of the housing body 5. Therefore, the sensor unit 2 does not impose a limitation on the apparatus structure nor adversely affect the outward appearance of the illumination apparatus.

The shade unit 6 is formed into a cylindrical shape with a bottom portion so that it can close the opening of the housing body 5. The bottom portion of the shade unit 6 is made of a material such as acryl or glass through which the electromagnetic waves from the sensor unit 2 and the light emitted from the LEDs 10 can pass. Thus, the shade unit 6 controls the illuminance in an illuminated space by passing the electromagnetic waves from the sensor unit 2 into the illuminated space and controlling the light emitted from the LEDs 10.

Hereinafter, the operation of the illumination apparatus in accordance with the present embodiment will be described with reference to the drawings. First, the sensor unit 2 transmits electromagnetic waves downwards. The electromagnetic waves thus transmitted are irradiated into the space below the light source substrate 11 through the areas in which the LEDs 10 and the conductor pattern 12 are absent. The electromagnetic waves thus irradiated are reflected by a wall surface surrounding the space or a moving object M, e.g., a man. The reflected waves pass through the light source substrate 11 once again and reach the sensor unit 2. The sensor unit 2 compares the frequency of the reflected waves with the frequency of the transmitted waves and outputs a detection signal to the control unit 3 depending on the results of detection.

Figure 5A:
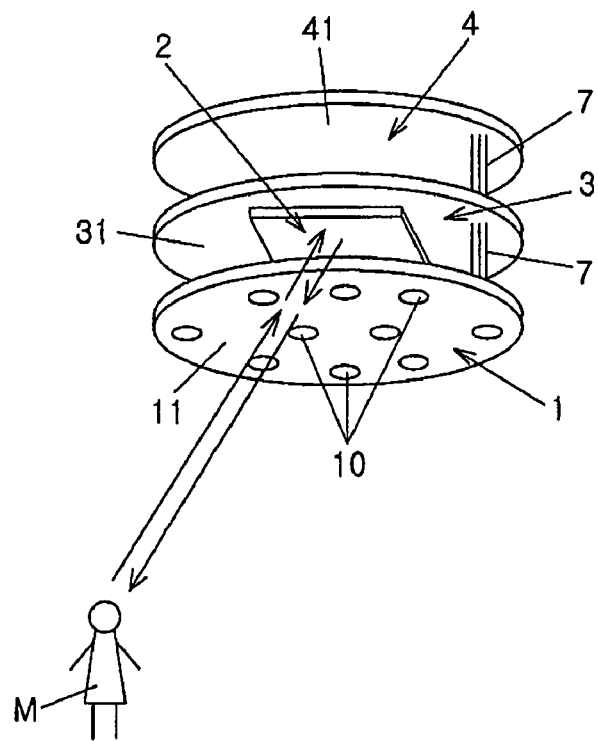
FIG. 5A is a perspective view illustrating an instance where electromagnetic waves are irradiated toward a moving object and FIG. 5B is a perspective view depicting an instance where electromagnetic waves are reflected from a light-emitting diode.

If a moving object M does not exist, the frequency of the reflected waves is equal to the frequency of the transmitted waves, in which case no Doppler frequency is detected. Therefore, the sensor unit 2 does not generate any detection signal and the control unit 3 performs a control operation to turn off the LEDs 10. If a moving object M exists as illustrated in FIG. 5A, the difference between the frequency of the reflected waves and the frequency of the transmitted waves is detected as a Doppler frequency. A detection signal corresponding to the Doppler frequency is outputted from the sensor unit 2 to the control unit 3. In response, the control unit 3 performs a control operation to turn on the LEDs 10.

Figure 5B:
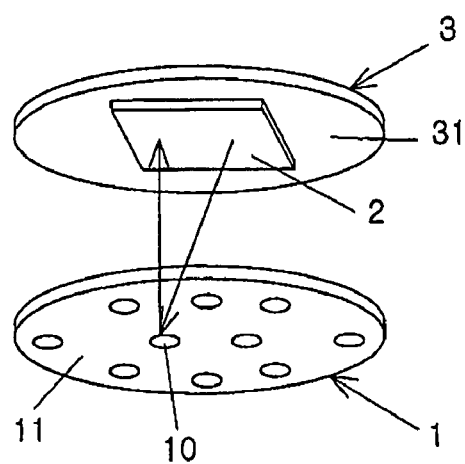
Figure 6:
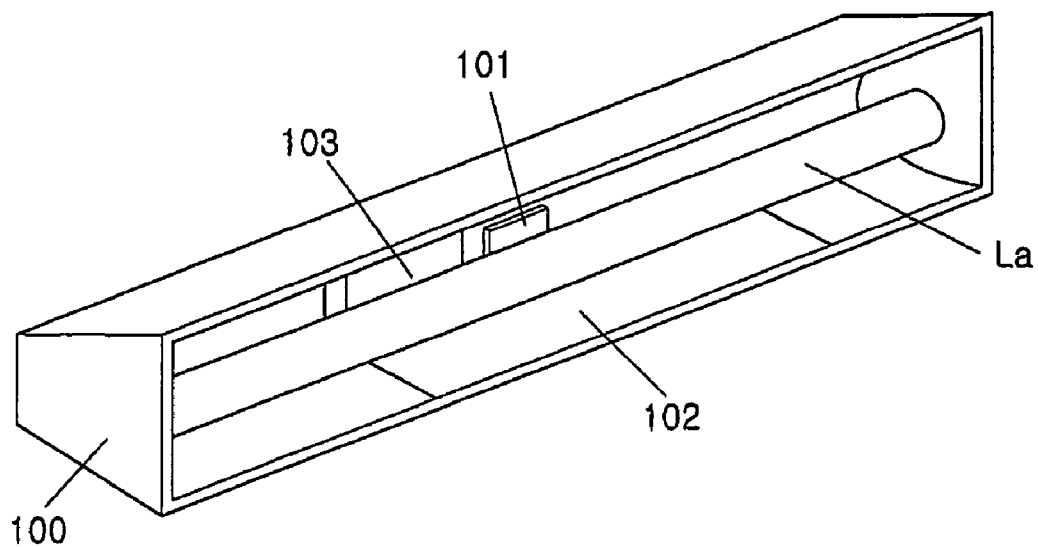
FIG. 6 is a perspective view showing a conventional illumination apparatus.

Referring to FIG. 5B, some of the electromagnetic waves transmitted from the sensor unit 2 are reflected by the LEDs 10 and the conductor pattern 12 without passing through the light source substrate 11. Inasmuch as the LEDs and the conductor pattern 12 are kept stationary, no Doppler effect is generated between the reflected waves and the transmitted waves, and no detection signal is outputted from the sensor unit 2. Unlike the conventional example using a discharge lamp as a light source, the sensor unit is prevented from staying in a detected state at all times, making it possible for the sensor unit 2 to accurately detect the presence or absence of a moving object A.

While the active sensor using electromagnetic waves is employed as the sensor unit 2 in the present embodiment, there is no need to limit the sensor unit 2 to this sensor. Alternatively, other kinds of active sensors such as an ultrasonic sensor and the like may be applied to the sensor unit 2.

While the invention has been shown and described with respect to the preferred embodiments, it will be understood by those skilled in the art that various changes and modification may be made without departing from the scope of the invention as defined in the following claims.

What is claimed is:

1. An illumination apparatus comprising:
    a light source unit including one or more solid light-emitting elements;
    a sensor unit including a wave transmission portion for transmitting energy waves of specified frequency and a wave reception portion for receiving the energy waves reflected from an object, the sensor unit being configured to output a detection signal by detecting the presence or absence of the object within a detection range based on the difference in frequency between the transmitted and received energy waves;
    a control unit configured to turn on the light source unit in response to the detection signal outputted from the sensor unit;
    a power source unit for supplying electric power to the light source unit, the power source unit being arranged outside the detection range of the sensor unit; and
    an open-bottom housing that accommodates therein the light source unit, sensor unit, control unit, and the power source unit,
    wherein the sensor unit is provided on the opposite side to the direction of light irradiated from the light source unit, and
    wherein the sensor unit is invisible from the outside of the housing body.

2. The illumination apparatus of claim 1, wherein the sensor unit is arranged so that the light source unit lies within the detection range.

3. The illumination apparatus of claim 1, wherein the light source unit further includes a light source substrate made of a material capable of passing the energy waves therethrough, the solid light-emitting elements being arranged on the light source substrate.

4. The illumination apparatus of claim 1, wherein the energy waves transmitted and received by the sensor unit are electromagnetic waves.

5. The illumination apparatus of claim 1, wherein the housing body includes an opening through which the light is irradiated, and
    wherein the sensor unit is invisible when viewed from the outside of the housing body through the opening.

6. The illumination apparatus of claim 1, wherein the light source unit further includes a light source substrate on which the solid light-emitting elements are arranged, and
    wherein a conductor pattern for electrically interconnecting the control unit, the power source unit, and the solid light-emitting elements is formed on the light source substrate while being arranged outside the detection range of the sensor unit.

7. The illumination apparatus of claim 3, wherein the sensor unit is arranged so that the light source unit lies within the detection range.

8. The illumination apparatus of claim 3, wherein the energy waves transmitted and received by the sensor unit are electromagnetic waves.

9. The illumination apparatus of claim 3, wherein the housing body includes an opening through which the light is irradiated, and wherein the sensor unit is invisible when viewed from the outside of the housing body through the opening.

10. The illumination apparatus of claim 3, wherein a conductor pattern for electrically interconnecting the control unit, the power source unit, and the solid light-emitting elements is formed on the light source substrate while being arranged outside the detection range of the sensor unit.

11. The illumination apparatus of claim 5, wherein the light source unit further includes a light source substrate on which the solid light-emitting elements being arranged, and
wherein the light source substrate is arranged to cover the sensor unit such that the sensor unit is invisible when viewed from the outside of the housing body through the opening.

12. The illumination apparatus of claim 5, wherein the sensor unit is arranged so that the light source unit lies within the detection range.

13. The illumination apparatus of claim 5, wherein the energy waves transmitted and received by the sensor unit are electromagnetic waves.

14. The illumination apparatus of claim 5, wherein the light source unit further includes a light source substrate on which the solid light-emitting elements being arranged, and
wherein a conductor pattern for electrically interconnecting the control unit, the power source unit, and the solid light-emitting elements is formed on the light source substrate while being arranged outside the detection range of the sensor unit.

15. The illumination apparatus of claim 9, wherein the light source substrate is arranged to cover the sensor unit such that the sensor unit is invisible when viewed from the outside of the housing body through the opening.

* * * * *

UNITED STATES PATENT AND TRADEMARK OFFICE
CERTIFICATE OF CORRECTION

PATENT NO. : 8,172,423 B2  
APPLICATION NO. : 12/588746  
DATED : May 8, 2012  
INVENTOR(S) : Tamami Sobagaki Page 1 of 1

It is certified that error appears in the above-identified patent and that said Letters Patent is hereby corrected as shown below:

Column 5, line 56: Please insert --10-- after "Inasmuch as the LEDs"

Column 6, line 27, in claim 1: Please insert --body-- after "open-bottom housing"

Signed and Sealed this  
Twenty-fifth Day of September, 2012

David J. Kappos  
*Director of the United States Patent and Trademark Office*